US010146559B2

United States Patent
Chen et al.

(10) Patent No.: US 10,146,559 B2
(45) Date of Patent: Dec. 4, 2018

(54) IN-APPLICATION RECOMMENDATION OF DEEP STATES OF NATIVE APPLICATIONS

(71) Applicant: Samsung Electronics Co., Ltd., Suwon-si, Gyeonggi-do (KR)

(72) Inventors: Eric Chen, Mountain View, CA (US); Eric J. Glover, Palo Alto, CA (US); Xueying Dai, Santa Clara, CA (US); Justin Feinman, Foster City, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 380 days.

(21) Appl. No.: 14/561,340

(22) Filed: Dec. 5, 2014

(65) Prior Publication Data

US 2016/0042050 A1 Feb. 11, 2016

Related U.S. Application Data

(60) Provisional application No. 62/035,322, filed on Aug. 8, 2014.

(51) Int. Cl.
| G06F 9/445 | (2018.01) |
| G06Q 30/06 | (2012.01) |
| G06F 8/61 | (2018.01) |
| G06F 9/455 | (2018.01) |

(52) U.S. Cl.
CPC .............. *G06F 9/445* (2013.01); *G06F 8/61* (2013.01); *G06F 2009/4557* (2013.01); *G06Q 30/0631* (2013.01)

(58) Field of Classification Search
CPC .... G06F 2009/4557; G06F 8/61; G06F 9/445; G06Q 30/0631
See application file for complete search history.

(56) References Cited

U.S. PATENT DOCUMENTS

| 2006/0101341 A1* | 5/2006 | Kelly ............... G06F 17/30899 715/738 |
| 2009/0300547 A1 | 12/2009 | Bates et al. |
| 2012/0084292 A1 | 4/2012 | Liang et al. |

(Continued)

OTHER PUBLICATIONS

International Search Report and Written Opinion for related WO Application No. PCT/US2015/037405, dated Sep. 23, 2015.

*Primary Examiner* — Jorge A Casanova
(74) *Attorney, Agent, or Firm* — Jefferson IP Law, LLP

(57) ABSTRACT

A method includes receiving a request from a user device executing a native application. The request indicates an accessed state of the native application to which the native application is set. The method includes identifying one or more categories of the accessed state of the native application and recommended application resource identifiers based on features of the accessed state. Each of the recommended application resource identifiers references a different state of a native application. When a native application is selected by the user, the method includes setting the native application to the different state. For each of the application resource identifiers, the method includes identifying one or more recommended categories of the state referenced by the recommended application resource identifier and determining whether to recommend the different state referenced by the recommended application resource identifier based on features of the accessed state and features of the state of the application.

20 Claims, 13 Drawing Sheets

(56) References Cited

U.S. PATENT DOCUMENTS

2012/0254188 A1 10/2012 Koperski et al.
2012/0258738 A1 10/2012 Lee et al.
2012/0323898 A1 12/2012 Kumar et al.

* cited by examiner

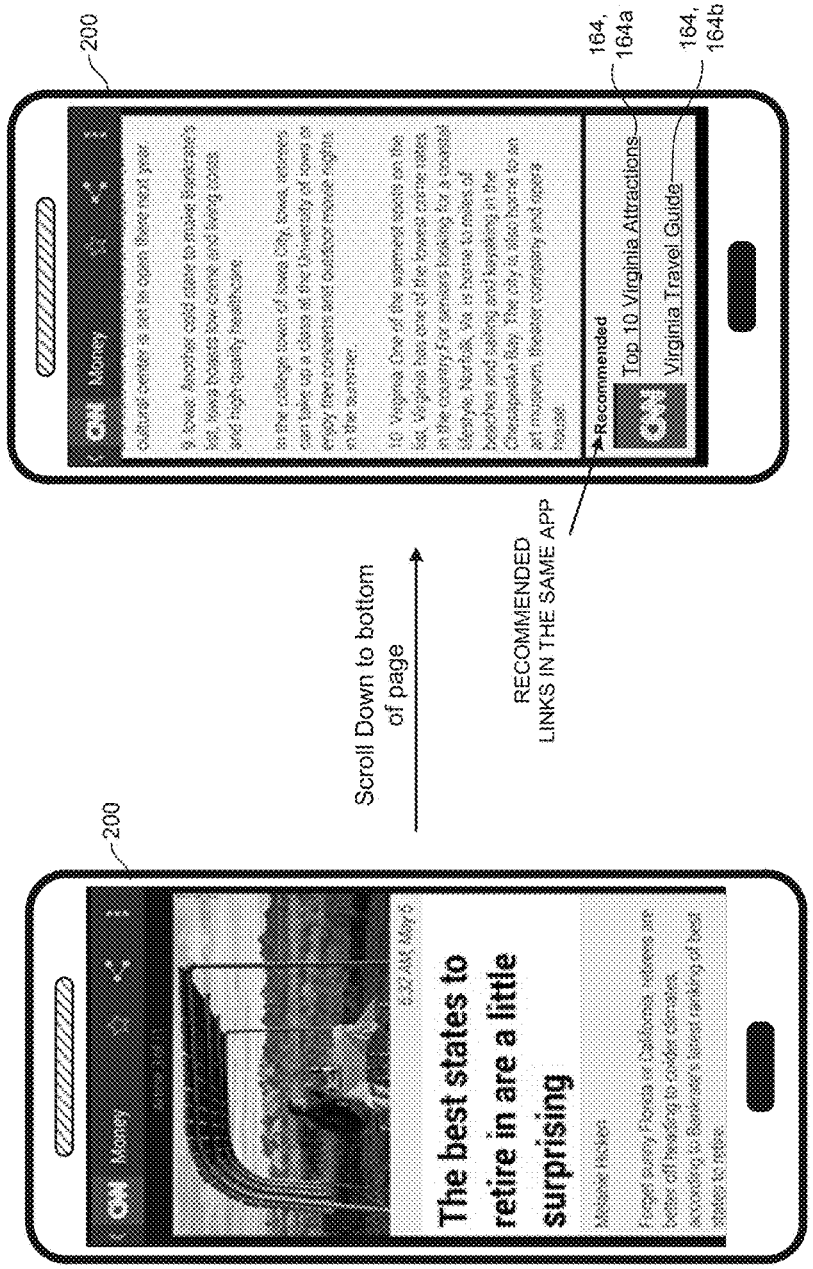

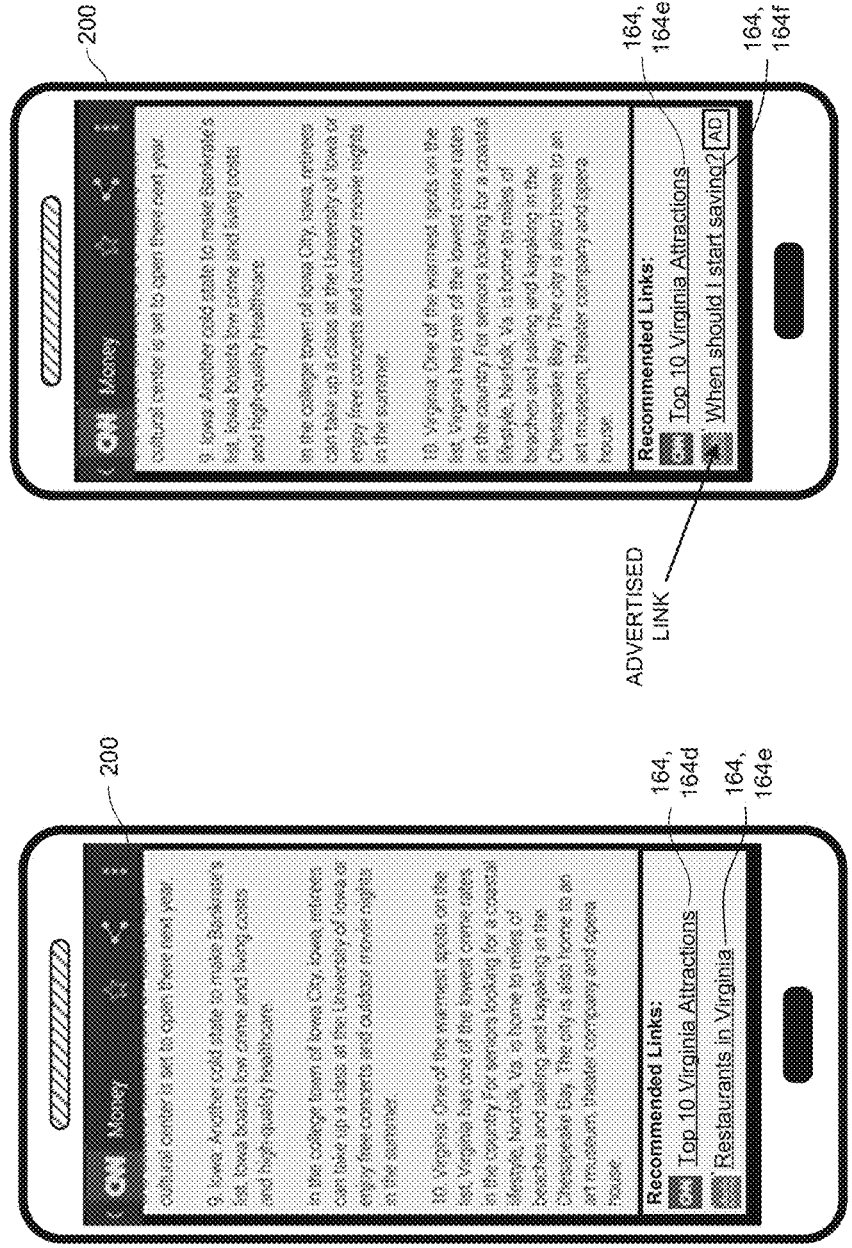

IN-APPLICATION RECOMMENDATION OF DEEP STATES OF NATIVE APPLICATIONS

CROSS REFERENCE TO RELATED APPLICATIONS

This U.S. patent application claims priority under 35 U.S.C. § 119 (e) to U.S. Provisional Application 62/035,322, filed on Aug. 8, 2014, which is hereby incorporated by reference in its entirety.

BACKGROUND

Mobile device users are increasingly relying on functionality provided in native applications instead of their web application counterparts. For example, rather than login to a website to obtain information via a web browser of the mobile device, a user can quickly access a native application on the mobile device. This saves the user from having to launch the web browser, enter a URL, access the web application, enter the login information, wait for the webpage to load, and then obtain the information. Furthermore, many native applications can provide functionalities that their counterpart web applications cannot.

SUMMARY

One aspect of the disclosure provides a method for in-application recommendation of deep states of native applications. The method includes receiving, at a processing device via a network, a request from a user device executing a native application indicated in the request. The request indicates an accessed state of the native application to which the native application is set. The method also includes identifying, at the processing device, one or more categories of the accessed state of the native application and identifying, at the processing device, a plurality of recommended application resource identifiers based on features of the accessed state. Each of the recommended application resource identifiers references a different state of a native application of a plurality of native applications. When a native application is selected by the user, the method includes setting the one native application to the different state. The plurality of applications includes the native application indicated by the application state indicator. For each of the recommended application resource identifiers, the method includes identifying, by the processing device, one or more recommended categories of the state referenced by the recommended application resource identifier and determining, by the processing device, whether to recommend the different state referenced by the recommended application resource identifier based on features of the accessed state and features of the state of the application. The determination includes at least one of the one or more categories of the accessed state and one or more recommended categories of the state referenced by the recommended application resource identifier. When the different state is to be recommended, the method further includes providing, by the processing device and via the network, the recommended application resource identifier to the user device in recommendation results.

Implementations of the disclosure may include one or more of the following optional features. In some implementations, the request includes an application resource identifier that, when selected by a user, sets the native application to the accessed state. Determining whether to recommend the different state by the recommended application resource identifier includes determining a score of the recommended application resource identifier based on the features of the state referenced by the recommended application resource identifier, including the one or more recommended categories, and the features of the accessed state, including the one or more categories, wherein the determination to recommend the different state is based on the score. Additionally or alternatively, the request further includes a geo-location of the user device and the score of each recommended application resource identifier is further based on the geo-location.

Determining the score of each recommended application resource identifier includes retrieving an accessed state recommendation record from a plurality of recommendation records based on a resource identifier indicating the accessed state and the accessed state recommendation record stores features of the accessed state. The method further includes retrieving a recommendation record storing the recommended application resource identifier from a plurality of recommendation records based on one or more features stored in the recommendation record and one or more features stored in the accessed state recommendation record. Each recommendation record of the plurality of recommendation records respectively defines features of a different state of one of a plurality of native applications. The method further includes determining the score of the recommendation record based on the features stored in the recommendation record and the features stored in the accessed state recommendation record.

Retrieving the accessed state recommendation record may include determining whether the accessed state recommendation record is stored among the plurality of recommendation records. When the accessed state record is not stored among the plurality of recommendation records, the method includes obtaining data associated with the accessed state of the native application from the native application and generating the accessed state recommendation record. The method further includes storing the accessed state recommendation record among the plurality of recommendation records and retrieving the accessed state recommendation record. Each of the recommendation records includes a plurality of fields that respectively define the one or more features of the defined state, each field having a weight attributed thereto. The weight is attributed to the feature defined in the field, and wherein the score of recommended application resource identifier is further based on the weights attributed to the one or more features defined in the recommendation record of the recommended application resource identifier.

The recommendation record may include one or more request parameters. The request parameters define a number of application resource identifiers to include in the recommendation results and/or types of application resource identifiers to include in the recommendation results. At least one of the application resource identifiers may be used to access a sponsored state of an application. At least one of the application resource identifiers may further be used to access a state of a different native application.

Another aspect of the disclosure provides a recommendation engine for in-application recommendation of deep states of native applications. The recommendation engine includes a network interface device that communicates with external devices over a network, a storage device storing a recommendation data store and a processing device that executes computer readable instructions. Each recommendation record respectively corresponds to a different state of one of a plurality of native applications and stores an application resource identifier to access the state of the native application. When the computer readable instructions are executed by the processing device, the processing device receives, via a network, a request from a user device executing a native application indicated in the request. The request indicates an accessed state of the native application to which the native application is set. The instructions further cause the processing device to identify, at the processing device, one or more categories of the accessed state of the native application and to identify a plurality of recommended application resource identifiers based on features of the accessed state defined in an accessed state recommendation record corresponding to the accessed state and stored in the recommendation data store. Each of the recommended application resource identifiers references a different state of one of the plurality of native applications and, when selected by the user, setting the referenced native application to the different state. The plurality of applications includes the native application indicated by the application state indicator. For each of the recommended application resource identifiers, the instructions cause the processing device to identify one or more recommended categories of the state referenced by the recommended application resource identifier and determine whether to recommend the different state referenced by the recommended application resource identifier based on features of the accessed state and features of the state of the application. The determination includes at least one of the one or more categories of the accessed state and one or more recommended categories of the state referenced by the recommended application resource identifier. When the different state is to be recommended, the recommendation engine provides the recommended application resource identifier in recommendation results to the user device in the network.

This aspect may include one or more of the following optional features. The request may include an application resource identifier that, when selected by a user, sets the native application to the accessed state. Determining whether to recommend the different state referenced by the recommended application resource identifier includes determining a score of the recommended application resource identifier based on features of the state referenced by the recommended application resource identifier, including the one or more recommended categories, and the features of the accessed state, including the one or more categories, and wherein the determination to recommend the different state is based on the score. Additionally or alternatively, the request may include a geo-location of the user device and the score of each recommended application resource identifier is further based on the geo-location.

Determining the score of each recommended application resource identifier may include retrieving the accessed state recommendation record from the recommendation data store based on an accessed state resource identifier indicating the accessed state. The accessed state recommendation record stores features of the accessed state. Determining the score further includes retrieving a recommendation record storing the recommended application resource identifier from the recommendation data store based on one or more features stored in the recommendation record and one or more features stored in the accessed state recommendation record. The recommendation engine further includes determining the score of the recommendation record based on the features stored in the recommendation record and the features stored in the accessed state recommendation record. Retrieving the accessed state recommendation record further includes determining whether the accessed state recommendation record is stored among the plurality of recommendation records. When the accessed state record is not stored among the plurality of recommendation records, the recommendation engine includes obtaining data associated with the accessed state of the native application from the native application, generating the accessed state recommendation record, storing the accessed state recommendation record among the plurality of recommendation records and retrieving the accessed state recommendation record.

In some implementations, each of the recommendation records includes a plurality of fields that respectively define the one or more features of the defined state, each field having a weight attributed thereto. The weight is attributed to the feature defined in the field, and wherein the score of recommended application resource identifier is further based on the weights attributed to the one or more features defined in the recommendation record of the recommended application resource identifier. The recommendation request may further include one or more request parameters. The request parameters define a number of application resource identifiers to include in the recommendation results and/or types of application resource identifiers to include in the recommendation results. At least one of the application resource identifiers may be used to access a sponsored state of an application. At least one of the application resource identifiers may also be used to access a state of a different native application.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 3A-3G are schematics illustrating example graphical user interfaces displayed by a native application configured to recommend different states of native applications.

Like reference symbols in the various drawings indicate like elements.

DETAILED DESCRIPTION

Figure 1A:
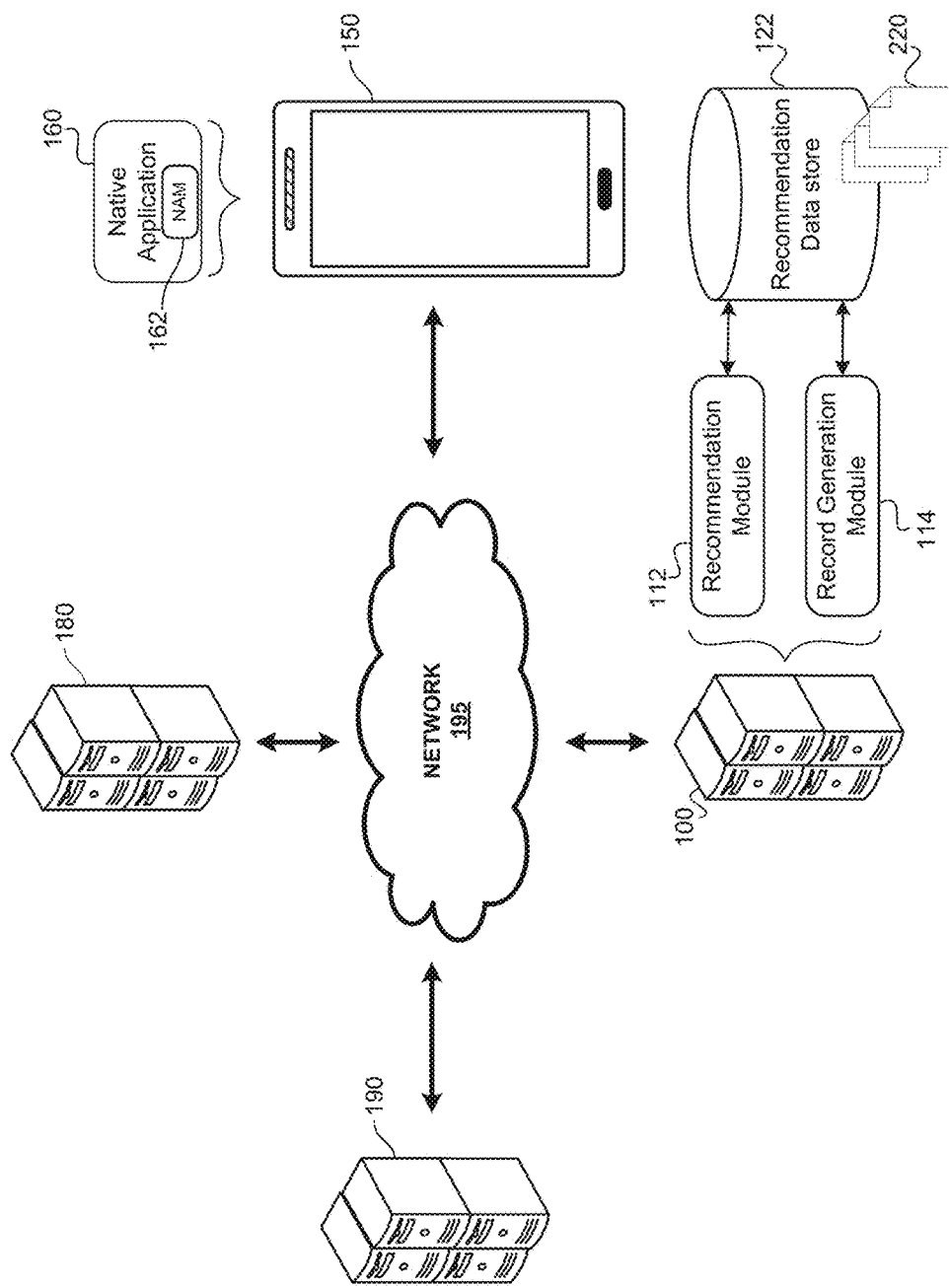
FIGS. 1A and 1B are schematics illustrating an example environment of a recommendation engine that receives recommendation requests from user devices.
Figure 1B:
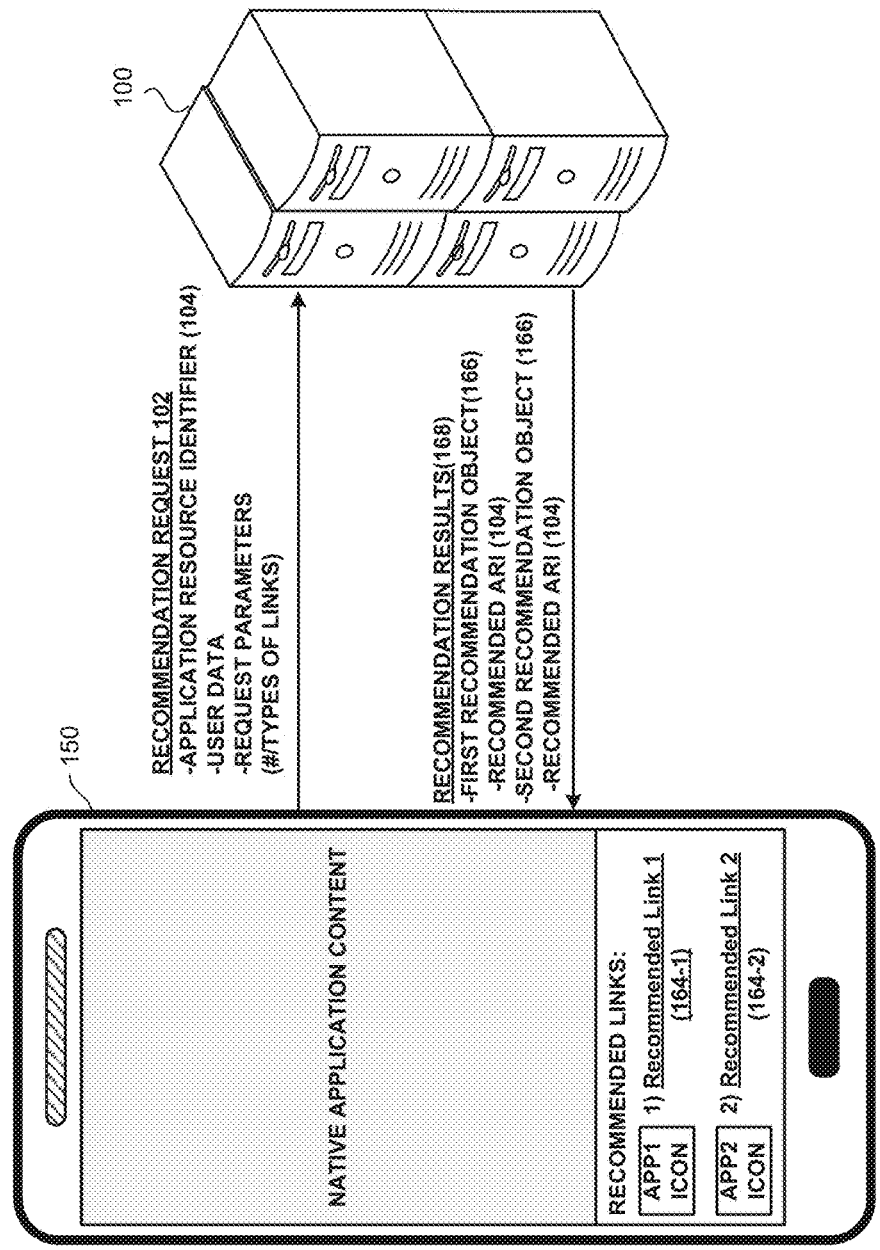

Referring now to FIGS. 1A-1D, a recommendation engine 100 is a collection of one or more computing devices that receives recommendation requests 102 from any number of user devices 150. In particular, a user device 150 executes a native application 160 that is configured to issue the recommendation request 102 to the recommendation engine 100. A native application 160 may be an application developed by a third party (e.g., a party that is different than the party that develops/provides the recommendation engine 100) where at least a portion of the computer readable instructions that deliver the functionality of the application are installed on and executed by the user device 150. A recommendation request 102 can refer to an electronic request that the native application 160 transmits to the recommendation engine 100 that requests content (e.g., content that relates to the state of the native application currently being accessed or may be relevant to the user). In response to the recommendation request 102, the recommendation engine 100 identifies one or more application resource identifiers 104 to recommend to the user of the user device 150 based on the contents of the recommendation request 102. An application resource identifier 104 may refer to a string of characters (e.g., letters, numbers, and/or symbols) that identities a state of a native application 160. An application resource identifier may include a reference to a native application 160 and one or more operations for the user device 150 (e.g., the native application 160 and/or operating system 170 of the user device) to perform in order to access a state specified by the application resource identifier 104. For example, the application resource identifier 104 may include a reference to a native application 160, a domain name, and a path to be used by the native application 160 to retrieve and display information to the user. In this way, an application resource identifier 104 may be embedded in a user selectable recommended link (referred to as a "recommended link" (e.g., 164-1, 164-2), such that when a user selects (e.g. presses on) the recommended link, the user device 150 sets the native application indicated by the application resource identifier 104 to the state indicated by application resource identifier 104.

The recommendation engine 100 can transmit a recommended application resource identifier 104 to the user device 150, along with any other pertinent data (e.g., an icon of the native application, a name of the application, and/or a description of the state of the application referenced by the application resource identifier), in a recommendation object 166. A recommendation object 166 may include a set of instructions and/or data that a native application can render into a user selectable link 164. The native application 160 that issues the recommendation request 102 receives the recommendation object 166 and renders the recommendation object 166 into a recommended link 164. When the user selects the recommended link 164, the user device 150 sets a native application 160 to a state indicated by the application resource identifier 104. The application resource identifier 104 can link to a different state of the requesting native application 160, a state of a different native application 160, and/or to a digital distribution platform 190 where the user can download the linked to native application. Furthermore, in some implementations, a recommendation object 166 can contain instructions for rendering a video pre-roll (e.g., a video that automatically plays within the user selectable link). In some implementations, the recommendation engine 100 transmits the one or more recommendation objects 166 in a recommendation result set 168. The recommendation result set 168 can include additional data and/or instructions that allow the native application 160 to render and display the recommended links 164. For example, the recommendation result set 168 can include a layout file that defines the look and feel of the area that displays the recommended links 164 (e.g., fonts, font sizes, size of the card on which the links are displayed, etc.).

Figure 1C:
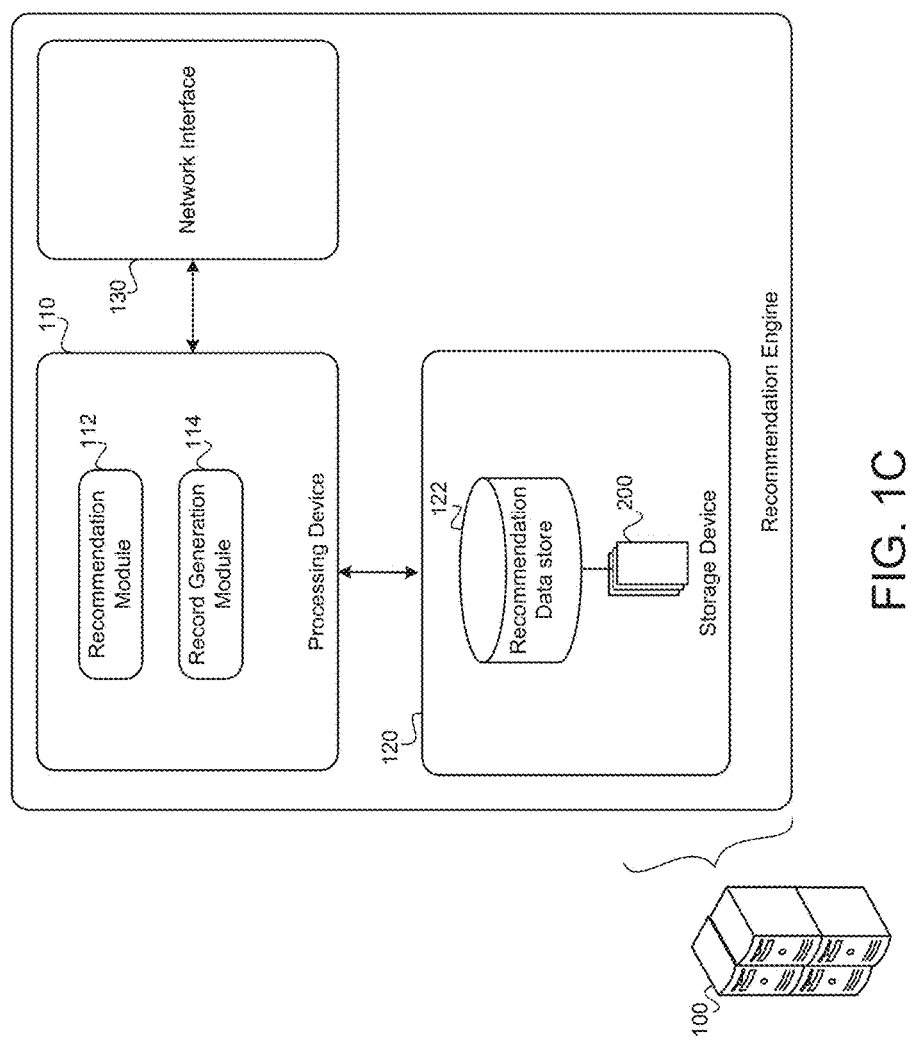
FIG. 1C is a schematic illustrating example components of a recommendation engine.
Figure 1D:
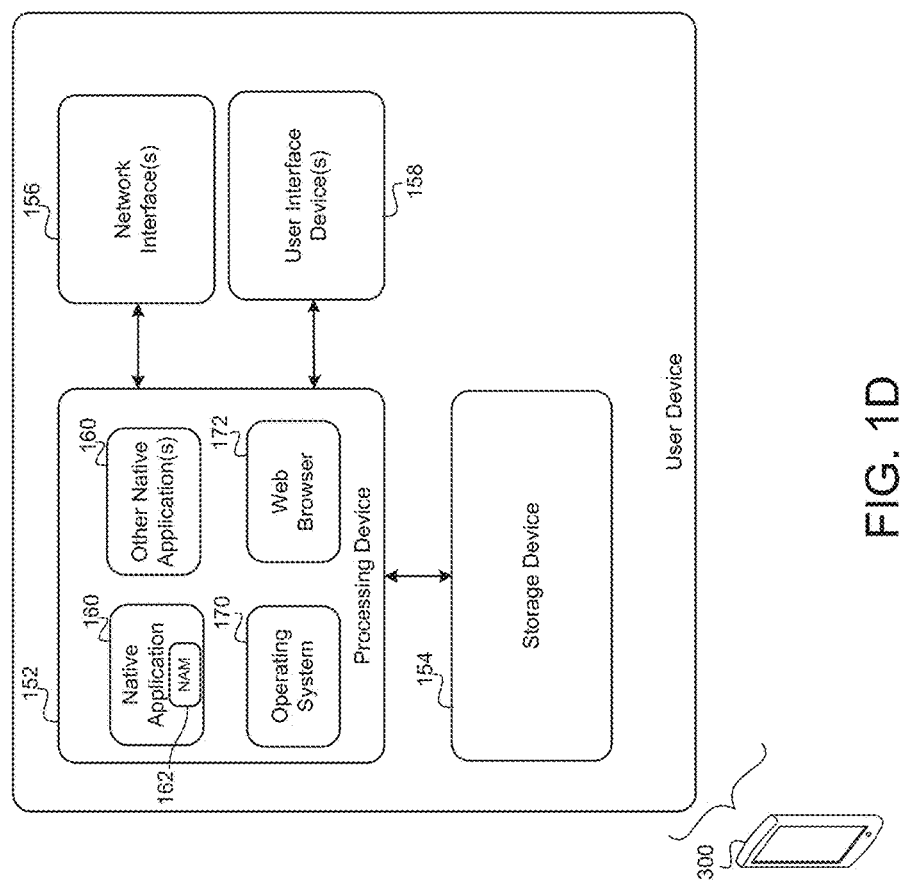
FIG. 1D is a schematic illustrating example components of a user device.

The user device 150 issues recommendation requests 102 to the recommendation engine 100 based on the activity of the user (e.g., states of applications accessed by the user). The user device 150 receives the recommendation result set 168 and displays the recommended links 164 to a user. FIG. 1D illustrates example components of a user device 150. In the illustrated example, the user device 150 includes a processing device 152, a storage device 154, a network interface device 156, and a user interface device 158. The user device 150 may include other components not explicitly depicted.

The processing device 152 includes memory (e.g., RAM and/or ROM) that stores computer readable instructions and one or more processors that execute the computer readable instructions. In implementations where the processing device 152 includes two or more processors, the processors can execute in a distributed or individual manner. The processing device 152 may execute a native application 160 that includes a native application module 162, any number of other native applications 160, a web browser 172, and an operating system 170, all of which may be embodied as computer readable instructions. The operating system 170 acts as an interface between the processing device 152 and the higher level applications 160, 172.

The storage device 154 includes one or more computer readable mediums (e.g., hard disk drive and/or flash memory). The storage device 154 can store the computer readable instructions that make up the native applications 160, the web browser 172, and the operating system 170. The network interface 156 includes one or more devices that are configured to communicate with the network. The network interface 156 can include one or more transceivers for performing wired or wireless communication. Examples of the network interface 130 can include, but are not limited to, a transceiver configured to perform communications using the IEEE 802.11 wireless standard, an Ethernet port, a wireless transmitter, and a universal serial bus (USB) port. The user interface 158 includes one or more devices that receive input from and/or provide output to a user. The user interface 158 can include, but is not limited to, a touchscreen, a display, a QWERTY keyboard, a numeric keypad, a touchpad, a microphone, and/or speakers.

The processing device 152 executes a native application 160 configured with a native application module 162. The native application module 162 is a set of computer readable instructions embedded (e.g., by the developer) in the native application 160. In some implementations, the developers may utilize a software developer kit (SDK) provided by the provider of the recommendation engine 100 to implement the native application module 162. When the user accesses a state of the native application 160 that calls the native application module 162, the native application module 162 generates a recommendation request 102 based on the state of the native application that is currently being accessed (referred to as the "accessed state"). An example recommendation request 102 can define a state of the native application 160 and can further define additional parameters that may be used by the recommendation engine 100 to make recommendations. In some implementations, the native application module 162 determines an application resource identifier 104 of the accessed state and includes the application resource identifier 104 in the recommendation request 102. The native application module 162 may further request a geolocation of the user device 150 from the operating system 170 of the user device 150, which the native application module 162 includes in the recommendation request 102. Further, in some implementations, the native application module 162 can include user information which the user has agreed to share, such as age, gender, and/or preferences) in the recommendation request 102. Additionally or alternatively, the native application module 162 can include request parameters in the recommendation request. Request parameters can include any type of data that relates to the contents of the request 102. Examples of request parameters include, but are not limited to, a number of recommendation objects 166 to include in the recommendation results 168 and the types of links to include (e.g., only to the requesting native application, to other native applications, to advertisements, etc.). The native application module 162 transmits the recommendation request 102 to the recommendation engine 100.

The recommendation engine 100 receives a recommendation request 102 and identifies one or more application resource identifiers 104 that are relevant to the recommendation request 102. In some implementations, the recommendation engine 100 transmits the one or more application resource identifiers 104 to the user device 150 in one or more recommendation objects 166. FIG. 1C illustrates example components of a recommendation engine 100. In the illustrated example, the recommendation engine 100 includes a processing device 110, a storage device 120 that stores a recommendation data store 122. The user device 150 may include other components not explicitly depicted.

The processing device 110 can include memory (e.g., RAM and/or ROM) that stores computer executable instructions and one or more processors that execute the computer executable instructions. In implementations of two or more processors, the processors can operate in an individual or distributed manner. In these implementations, the processors can be arranged in a single computing device or across multiple computing devices (e.g., rack-mounted servers). The processing device 110 can execute a recommendation module 112 and a record generation module 114, both of which are embodied as computer executable instructions. The processing device 110 can execute additional components not explicitly depicted.

The network interface device 130 includes one or more devices that can perform wired or wireless (e.g., WiFi or cellular) communication. Examples of the network interface device 130 include, but are not limited to, a transceiver configured to perform communications using the IEEE 802.11 wireless standard, an Ethernet port, a wireless transmitter, and a universal serial bus (USB) port.

The storage device 120 can include one or more computer readable storage mediums (e.g., hard disk drives and/or flash memory drives). The storage mediums can be located at the same physical location or at different physical locations (e.g., different servers and/or different data centers). The storage device 120 stores a recommendation data store 122. The recommendation data store 122 stores recommendation records 200 (which are discussed in further detail below).

Figure 2A:
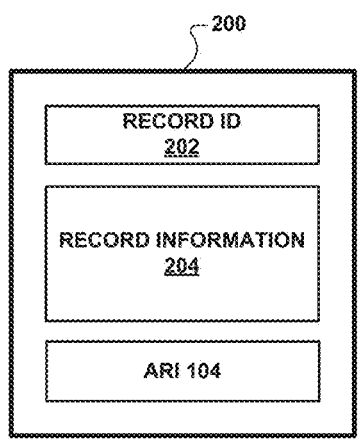
FIGS. 2A and 2B are schematics illustrating examples of a recommendation record.
Figure 2B:
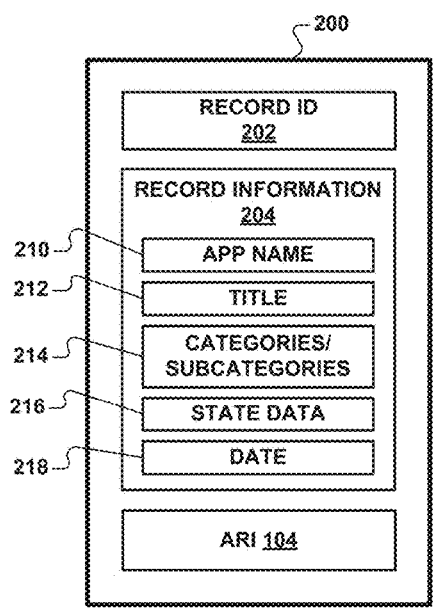

FIGS. 2A and 2B illustrate examples of a recommendation record 200. A recommendation record 200 may include, for example, a record ID 202, record information 204, and an application resource identifier 104. A recommendation record 200 corresponds to a particular state of a native application. Put another way, each recommendation record 200 identifies a unique state or function of one of a plurality of possible native applications 160. The record ID 202 uniquely identifies the recommendation record 200 from other recommendation records 200. In some implementations, the record ID 202 can be an integer or string. The application resource identifier 104 is the application resource identifier 104 of the state of the native application defined by the recommendation record 200. In some implementations, the recommendation record 200 can further store application resource identifiers 104 to access a digital distribution platform, whereby the state defined by the application resource identifier 104 is where the native application 160 defined in the recommendation record 200 can be downloaded.

The record information 204 can store any information that is pertinent to the state of the native application corresponding to the recommendation record 200. In some implementations, the record information 204 may include, but is not limited to, an application name 210, a title 212 of the state, one or more categories/subcategories 214, state data 216, and a state date 218. The application name 210 is the name provided to the application by the application developers. The title 212 is the title which is provided to the state by the application provider or any other party. For example, if the state of a native application 160 is an article, the title 212 of the state may be the title of the article. In another example, if the state of a native application 160 is a page where a product is displayed and may be purchased by a user, the title 212 may include the name of the product. The one or more categories/subcategories 214 are tags that may be applied to the recommendation record 200 that identify a type of the state. For example, if the state of the native application 160 is an article reviewing a Thai Restaurant in Detroit Mich., the category 214 may define "Restaurant Review" and the subcategories 214 may define "Thai Restaurant Review," "Michigan Restaurant Review," "Detroit Restaurant Review," etc. The categories/subcategories 214 may be assigned to the record 200 by a human or may be extracted using known or later developed extraction/classification techniques. In the later scenario, a clustering module (not shown) may cluster (e.g., k-nearest neighbor clustering, k-means clustering, bi-clustering, etc.) the state data with state data of other previously classified application states to identify potential categories/subcategories 214. State data 216 may define any data or metadata of the state of the native application. For example, the state data 216 may include the text contained within the state of the native application, any keywords associated with the state of the application, any metadata tags applied to the state of the native application, a popularity of the state of the native application, or any other suitable information. The date 218 may define the date on which the state of the native application was initially made public or published. The foregoing list is an example of a recommendation record 200. Additional or alternative types of data may be stored in a recommendation record 200 without departing from the scope of the disclosure.

Referring back to FIGS. 1A-1D, the record generation module 114 generates the recommendation records 200. In particular, the record generation module 114 indexes content from different native applications. The record generation module 114 may include one or more crawlers that crawl native applications, or in some cases, web applications (e.g., websites) that correspond to native applications (e.g., the web version of a native application). Additionally or alternatively, an application provider may provide access to the various states of a native application (e.g., a data dump), whereby the record generation module 114 analyzes and indexes the provided data. The record generation module 114 can format the data in an app-specific format. For example, each application or set of applications may have its own app-specific ontology that is used to classify and/or tag the data that is entered in the recommendation records 200. An application specific ontology may define the manner by which record information 204 is formatted in a recommendation record 200. For example, the ontology may define how to format the application name 210, the title 212, the state data 216, and the application resource identifier 104, as well as the possible categories/subcategories 214 that can exist in a particular application. The ontology may be machine-learned and/or can be developed in conjunction with the application developers.

The recommendation module 112 accesses the recommendation records 200 to determine which application resource identifiers 104 to recommend in response to a recommendation request 102. The recommendation module 112 generates the recommendation results 168 based on the identified application resource identifiers 104 and transmits the recommendation results 168 to the user device 150.

In operation the recommendation module 112 receives a recommendation request 102 from a user device 150 via a network. The recommendation request 102 can include an application resource identifier 104 of the accessed state (e.g., the state of the native application that the user device 150 is currently accessing) and/or a record ID corresponding to the accessed state. The recommendation request 102 may further include recommendation parameters, which define the type of recommendations the system should make. The recommendation module 112 can access the recommendation data store 122 using the application resource identifier 104 or the record ID contained in the recommendation request 102, whereby the recommendation module 112 obtains the recommendation record 200 of the received application resource identifier 104 or record ID. In some scenarios, the received application resource identifier 104 may not have been indexed by the record generation module 114. For instance, if the accessed state defines newly published content (e.g., a current newspaper article), there may be no corresponding recommendation record 200 in the recommendation data store 122. In these scenarios, the recommendation module 112 may call the record generation module 114 using the application resource identifier 104 that was received in the recommendation request 102. The record generation module 114 can generate a new recommendation record 200 corresponding to the accessed state in real-time, such that the recommendation module 112 can retrieve the newly generated recommendation record 200.

In some implementations, the recommendation module 112 identifies recommendation records 200 that are similar to the retrieved recommendation record 200. For example, the recommendation module 112 can search the recommendation data store 122 for recommendation records that match one or more categories or subcategories with the retrieved recommendation records. Additionally or alternatively, the recommendation module 112 can search the recommendation data store 122 for recommendation records 200 that match one or more keywords stored in the state data 216. The recommendation module 112 can include any identified recommendation records 200 in a consideration set of records. The consideration set of records may contain the records 200 themselves, or the record ID of each identified recommendation record 200.

The recommendation module 112 may score each record 200 identified in the consideration set of records. The score of a recommendation record 200 identified in the consideration set can be indicative of a degree of relatedness between the recommendation record 200 and the recommendation record 200 corresponding to the recommendation request 102. In some implementations, the recommendation records 200 may be structured to include a plurality of fields, so that the recommendation module 112 can compare the values of the same fields. For example, the recommendation module 112 may compare the values in app-specific fields and/or data between the two states to determine if there is a relation. For example, for a cooking related application, each article contained in the application may have a respective recommendation record 200 and may include fields which identify, a name 210 of the application, a title 212 of the article, a category 214 of the cuisine to which the article relates, a subcategory 214 of the cuisine, and the ingredients discussed in the article. The fields within a recommendation record 200 may have weights assigned thereto, such that a greater emphasis is given to fields having greater weights. For instance, with respect to the cooking application, greater emphasis may be provided to the category 214 or subcategory 214 of the cuisine as compared to the ingredients (i.e., keywords) discussed in the article. In some implementations, the hierarchy of weights from greatest to least is subcategory, category, state data, title, etc. For example, a match of subcategories 214 may be worth a first amount of points (e.g., 10 points), a match of categories 214 may be worth a second amount of points (e.g., 6 points), a match in keywords in the state data 216 may be worth a third amount of points (e.g., 1 point), etc. In these implementations, the record generation module 114 scores each recommendation record 200 based on the amount of matches and the value or weights associated with each type of matching field. Furthermore, the weighting scheme that is applied to each field may depend on the recommendation record 200 identified in the recommendation request 102. For instance, a recommendation request 102 that identifies a state of a cooking application may place greater emphasis on subcategory matches, whereas a recommendation request 102 that identifies a state of a news application may place a greater emphasis on keyword matches. The recommendation module 112 may take any suitable information into account when determining the score. For example, the recommendation module 112 may take into account categories, subcategories, keywords contained in the state data 216, geolocation of the user device 150, a geolocation pertinent to the application, similarity in content of the states, and data indicating the age of the respective states (e.g., the date on which the content was first published). The recommendation module 112 can score the records in any other suitable manner.

In some implementations, the recommendation module 112 can filter the consideration set according to the recommendation parameters contained in the recommendation request 102. For instance, the recommendation request 102 may require that any recommended states be within the native application from which the recommendation request 102 was issued. In this example, only recommendation records that correspond to the native application 160 issuing the recommendation request 102 are included in the consideration set. In another example, a recommendation request 102 may require that the recommended states must be sponsored states (e.g., an advertised state within a native application). In this example, only recommendation records 200 that define sponsored states are included in the consideration set.

The recommendation module 112 can rank the scored recommendation records indicated by the consideration set. The recommendation module 112 can select the N highest ranked recommendation records 220 to base recommendations on. N is an integer value greater than or equal to one. The value of N can be a default value or can be included in the recommendation request 102. If, for example, N=2, then the recommendation module 112 can select the two highest scored recommendation records on which the recommendation results 168 are based, provided the two highest scoring recommendation records 200 comply with the recommendation parameters defined in the recommendation request 102.

In some implementations, the recommendation module 112 accesses a lookup table using the application resource identifier 104 and/or the record ID 202 contained in the recommendation request 102. In these implementations, the lookup table may store the recommended application resource identifiers 104 in relation to each indexed application resource identifier 104 and/or record ID 202. In this way, the lookup table outputs a set of recommended application resource identifiers 104 upon receiving an application resource identifier 104 or record ID 202 as input. In some of these implementations, the recommended application resource identifiers 104 may be pre-ranked. In these implementations, the recommendation module 112 would not need to score each corresponding recommendation record 200 prior to selecting which recommendation records 200 on which the recommendation results 168 are to be based.

Once the recommendation module 112 has selected which recommendation records 200 on which to base the recommendation results 168, the recommendation module 112 generates the recommendation results 168 based on the selected recommendation records 200. In some implementations, the recommendation module 112 can generate a recommendation object 166 for each selected recommendation record 200. The recommendation module 112 can use a template to generate the recommendation object 166. The recommendation module 112 can insert the application resource identifier 104, any visual data (e.g. icons or images), and/or textual data (e.g., a description of the recommended state) in the result object 168. In some implementations, the recommendation module 112 obtains the visual data and the textual data from the corresponding recommendation record 200. Furthermore, in some implementations, the recommendation module 112 includes an application resource identifier to a state of a digital distribution platform where the linked to application 160 can be downloaded. In these implementations, the user can download the native application 160 using a recommendation link so that the recommended state of the native application 160 can be accessed. The recommendation module 112 transmits the recommendation results 168 to the user device 150 via the network.

The operating system 170 of the user device 150 receives the recommendation results 168 containing the recommendation objects 166 and routes the recommendation results 168 to the native application 160, which are processed by the native application module 162. The native application module 162 renders one or more recommended links 164 based on the one or more received recommendation objects 166. The recommended links 164 are displayed in the graphical user interface of the native application.

Figure 3E:
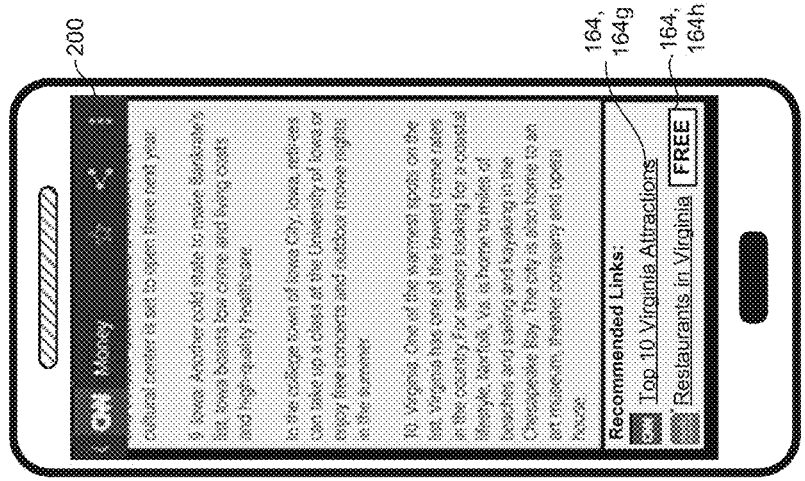

FIGS. 3A-3G illustrate examples of a native application displaying recommended links 164 In the illustrated example of FIG. 3A, the processing device 152 of the user device 150 is executing a native news application 160 (e.g., the CNN news application provided by the Turner Broadcasting System division of Time Warner, Inc.). In the illustrated example, the accessed state is a news article regarding the best states to retire in (an article entitled "The Best States To Retire In Are A Little Surprising"). In this example, the article contains text which describes different areas in the United States for a retiree to live in. In FIG. 3B, the user has scrolled down to the bottom of the page, where the native news application 160 is displaying two recommended links 164a, 164b. In this example, both recommended links 164 link to other states within the native news application 160. For example, the first link 164a links to a first recommended state that is another article that lists the "Top 10 Virginia Attractions," and the second link 164b links to a second recommended state that is another article that lists a "Virginia Travel Guide."

In the example of FIG. 3C, the user has scrolled down to the bottom of the "The Best States To Retire In Are A Little Surprising" article, where the native news application 160 is displaying two recommended links 164c, 164d. In this example, the first recommended link 164c links to a first state within the native news application 160 currently being executed ("Top 10 Virginia Attractions"). The second recommended link 164d links to a second recommended state of a different native application 160 that identifies "Restaurants in Virginia." In this example, the second recommended link 164d includes an embedded application resource identifier that identifies a different native application. For instance, if the application is called "Restaurant Lister" the application resource identifier 104 may be in an application-specific format for the application (e.g., restaurantlister:// United-States.Virginia). In this example, the native application module 162 of the native news application 160 may have requested links to any native application 160 and the recommendation engine 100 may have identified the "Restaurants in Virginia" state of the "Restaurant Lister" application as one of the two most relevant recommendations.

In the example of FIG. 3D, the user has scrolled down to the bottom of the "The Best States To Retire In Are A Little Surprising" article, where the native news application 160 is displaying two recommended links 164e, 164f. In this example, the first recommended link 164e links to a first state within the native news application 160 currently being executed ("Top 10 Virginia Attractions"). The second recommended link 164f links to a sponsored state of a different native application 160. A sponsored state is a state of a native application 160 where a third party has agreed to exchange a monetary value in exchange for an action being performed with respect to the state. For instance, the third party has agreed to pay money in exchange for the recommended link being displayed or being clicked on. In the illustrated example, the sponsored state is an article entitled "When should I start saving?"

In FIG. 3E, the user has scrolled down to the bottom of the "The Best States To Retire In Are A Little Surprising" article, where the native news application 160 is displaying two recommended links 164g, 164h. In this example, the first recommended link 164g links to a first application state within the native news application 160 currently being executed ("Top 10 Virginia Attractions"). The second recommended link 164h links to a digital distribution platform, whereby the user can download the "Restaurant Lister" native application 160 from the digital distribution platform. In particular, the recommended link 164h indicates that the user can download the "Restaurant Lister" native application for free. When the user selects this recommended link, the user device 150 can launch the native application 160 that accesses the digital distribution platform and access the state of the digital distribution platform that provides the "Restaurant Lister" native application 160 for download. The user device 150 utilizes an application resource identifier 104 that identifies the digital distribution platform native application and the application state corresponding to the "Restaurant Lister" native application 160 within the digital distribution platform application. In some implementations, the native application module 162 can query the operating system 170 with a name or identifier of a native application indicated in a recommended application resource identifier to determine whether the application is installed on the user device 150. In some implementations, if the native application 160 is not installed, the native application module 162 requests the application resource identifier 104 to the digital distribution platform and generates the link to the digital distribution platform based thereon. In other implementations, the application resource identifier 104 of the state of the digital distribution platform is embedded in the received recommendation object 166, whereby the native application module 162 utilizes the application resource identifier 104 to generate the link to the digital distribution platform.

In some situations the native application 160 is not installed on the user device 150 and the user elects to download the native application 160 using the link 164 to the digital distribution platform. In this situation the native application module 162 can instruct the operating system 170 to launch the downloaded native application 160 upon completion of the download and to access the recommended state using the recommended application resource identifier 104 that identifies the recommended state. Techniques for automatically opening the recommended link of the newly installed native application 160 are now described. Initially, the native application module 162 may receive a target application package name and application resource identifier in the recommendation object 166. In response to the user selection of the link to the digital distribution platform, the operating system 170 launches the digital distribution platform application and sets the state thereof to the state where the application can be downloaded. The user can elect to download the native application 160. The native application module 162 is configured to detect when the newly downloaded native application 160 has been installed. Put another way, the native application module 162 "listens" to determine whether the application is installed. Once the native application is installed, the operating system 170 (e.g. at the instruction of the native application module 162) sets the newly installed native application 160 into the state specified by the application resource identifier of the recommended link to the native application 160 which was not initially installed.

Figure 3G:
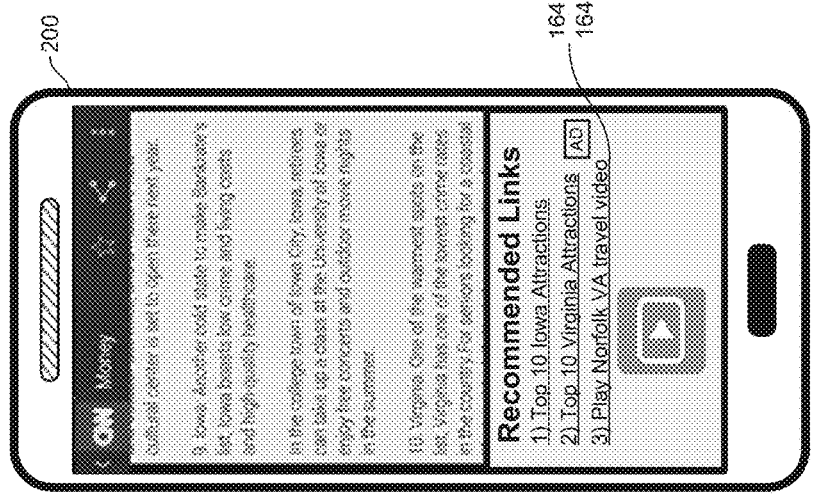
Figure 3F:
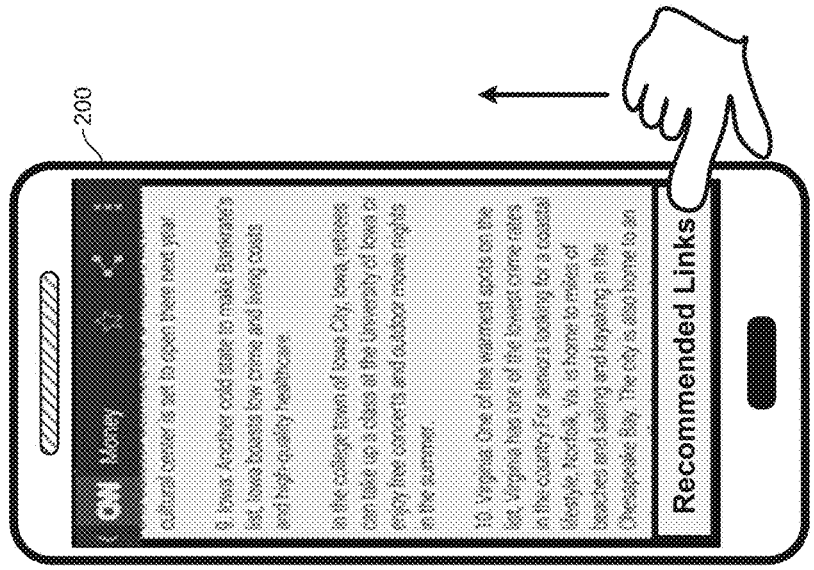

FIG. 3F illustrates another example of a GUI that may be displayed by the native application executing the native application module 162. In the illustrated example, the recommended links 164 (not shown) may be obscured in the GUI, unless the user elects to view the obscured links 164. In particular, the user can select (e.g., swipe) a graphical user interface element to see the recommended links. In this example, the user can swipe a displayed bar 300 upwards to see the recommended links 164. Additionally, or alternatively, the user can swipe up on the display on a portion not overlaying the displayed bar 300 to see the recommended links 164.

FIG. 3G illustrates an example where the native application module 162 can display recommended links 164 to media contents in the displayed recommendations. In this example, the user can select the recommended link 164i to view a video. The link 164 may include a video pre-roll, whereby the user can view the video within the GUI being displayed by the native application. In these implementations, the native application module 162 may access another application to obtain the video pre-roll, so that the video pre-roll is viewable within the GUI of the native application 160.

FIGS. 3A-3G are provided for example and to provide context. Additional and alternative information may be displayed in a link 164. For example, a link 164 may display an application name, an application developer, ratings, or any other suitable information. Furthermore, the arrangement, location, and sizing of the links 164, as well as the elements displayed therein, may be altered without departing from the scope of the disclosure.

Figure 4:
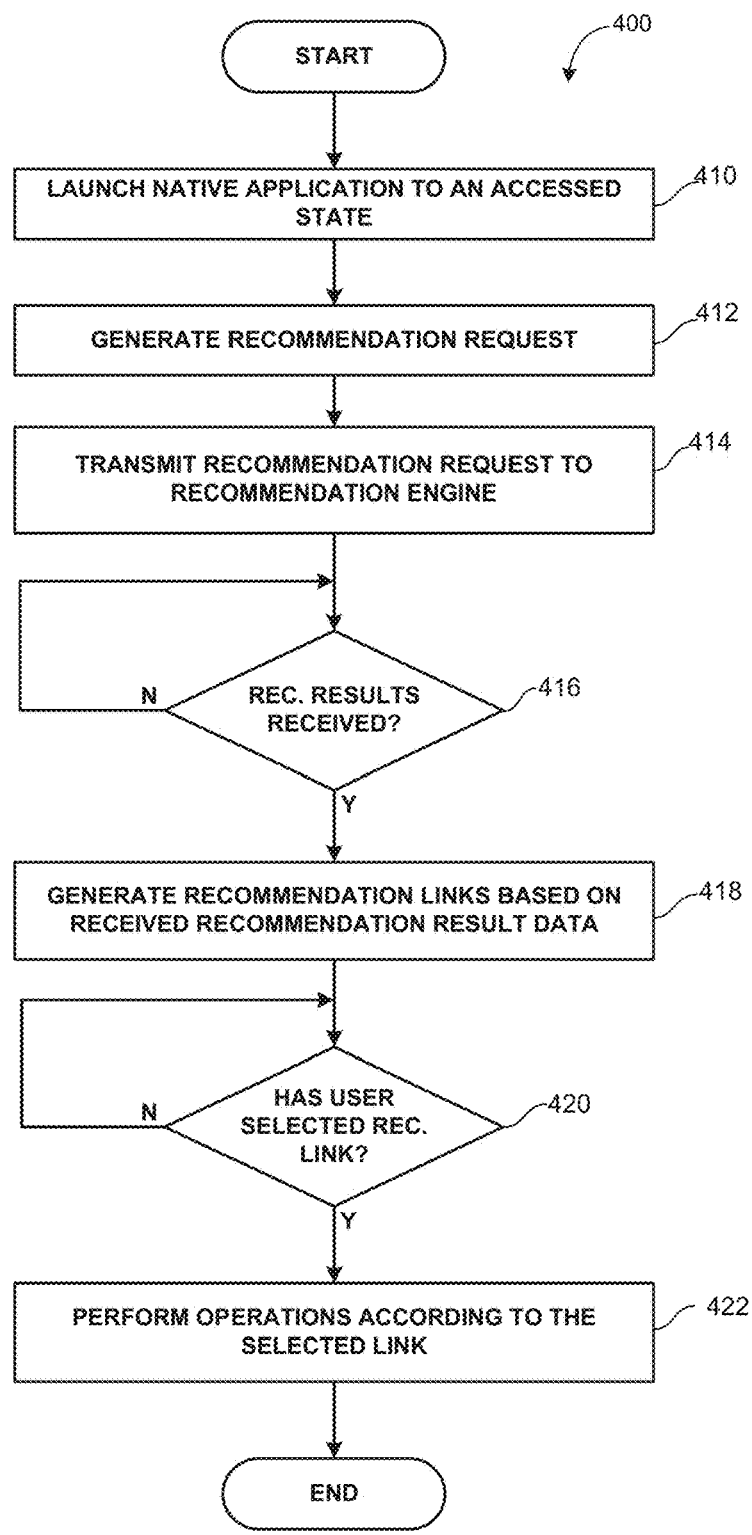
FIG. 4 is a flow chart illustrating an example set of operations for issuing a recommendation request to a recommendation engine.

Referring now to FIG. 4, an example set of operations for a method 400 for displaying recommended states is illustrated. The method 400 may be executed by a native application 160 executing on the processing device 152 of a user device 150.

At operation 410, the native application 160 sets itself to an accessed state. An accessed state may be any accessible state of the native application 160 and the contents depend on the functionality of the application itself. For example, an accessed state may be a specific news article, a level of a game, a review of a particular restaurant, a listing of restaurants in a specific city, etc. Under most scenarios, the native application 160 sets itself into a state in response to a user action (e.g., the user selects the accessed state).

At operation 412, the native application module 162 generates a recommendation request 102. The native application module 162 can determine the accessed state and any relevant user data. The native application module 162 can be triggered when the accessed state is accessed. The native application module 162 obtains the application resource identifier 104 of the accessed state and inserts the application resource identifier 104 in a recommendation request 102. The native application module 162 can further determine any relevant user data, such as a geolocation of the user device 150, a username of the user, and a platform of the user device 150. The native application module 162 can insert the user data in the recommendation request 102. The native application module 162 may further include recommendation parameters, such as a number of links 164 to include in the recommendation results 168 and the types of links 164 to include in the recommendation results (e.g., to states of the native application 160, states of any native applications 160, to sponsored ads, etc.). In some implementations, the recommendation parameters are hard coded in the native application module 162.

At operation 414, the native application module 162 transmits the recommendation request 102 to the recommendation engine 100. At operation 416, the native application module 162 waits until it receives recommendation results 168. At operation 418, the native application module 162 generates the user selectable recommendation links 164 based on the received recommendation results 168. In some implementations, the native application module 162 generates a recommended link 164 based on a corresponding recommendation object 166. The recommendation object 166 includes the application resource identifier 104 of a native application. The native application module 162 can render a recommended link 164 based on the application resource identifier 104, the visual data included in the recommendation object 166, and textual data contained in the recommendation object 166. The native application module 162 can display the generated recommended links 164 in a location designated by the application provider (e.g., bottom, top, right-hand side, in-line, etc.). In some implementations, the native application module 162 determines whether a linked-to native application 160 is installed on the user device 150 and if it is not, the native application module 162 can generate a link to a digital distribution platform instead of a link to the recommended state. In these implementations, the native application module 162 can request an application resource identifier to the digital distribution platform and to a state where the user can download the native application. The native application module 162 can generate a recommended link 164 to the digital distribution based on the application resource identifier received in response to such a request.

At operation 420, the native application 160 waits for user input (i.e., a selection of a link). If/when the user selects a recommended link 164, the native application initiates accessing the state indicated by the recommended link 164, at operation 422. If the recommended link 164 links to a state within the native application, the native application 160 can set itself to the new state. If the state is of another application, the native application 160 can transmit an instruction or request to the operating system 170 to launch the native application 160 indicated by the application resource identifier 104 to the recommended state. If the selected recommended link 164 is to a digital distribution platform 180, the native application 160 can provide an instruction or request to the operating system 170 to launch the digital distribution platform application and to set the state to the state where the user can download the native application 160 indicated by the recommended link 164.

Figure 5:
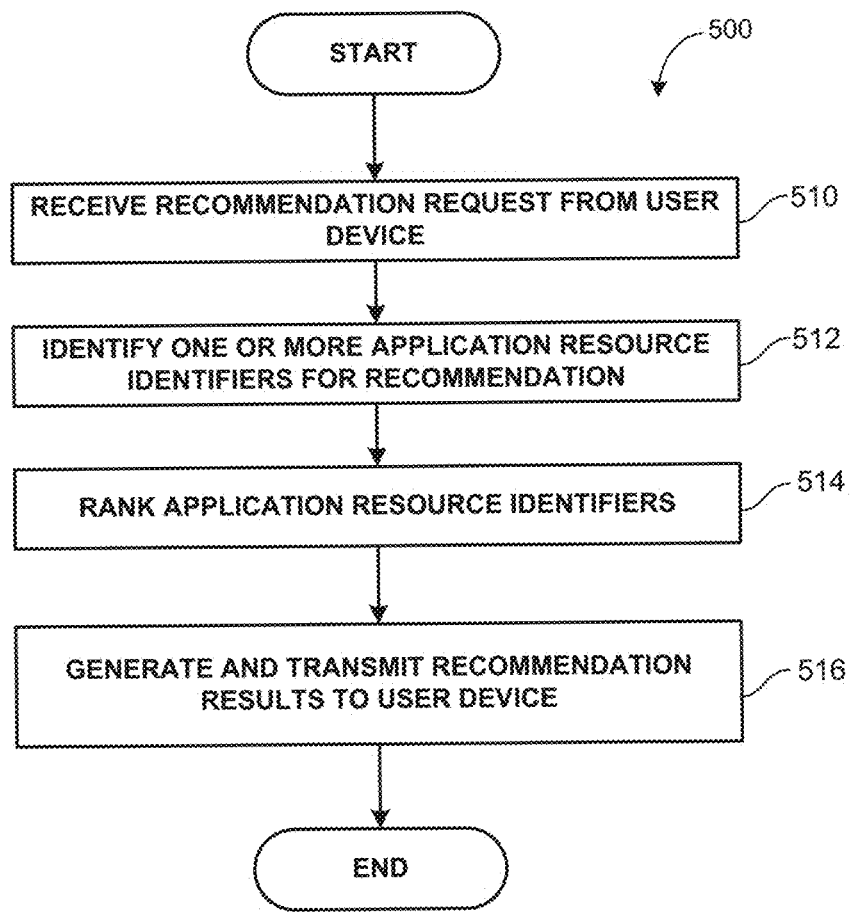
FIGS. 5-7 are flow charts illustrating example sets of operations for handling a recommendation request and recommending one or more states of native applications.

FIG. 5 illustrates an example set of operations for a method 500 for recommending one or more states of one or more native applications 160. The method 500 is executed by the processing device of the recommendation engine 100.

At operation 510, the recommendation module 112 receives a recommendation request 102 via the network 195. The recommendation request 102 can include an application resource identifier 104, user data (e.g., a geolocation), and/or request parameters. The recommendation module 112 determines the contents of the recommendation request 102.

At operation 512, the recommendation module 112 identifies one or more application resource identifiers 104 for recommendation. Initially, the recommendation module 112 retrieves a recommendation record 200 from the recommendation data store 122 corresponding to the received application resource identifier 104 using the received application resource identifier 104. The recommendation module 112 can identify recommendation records 200 of other states of applications based on the contents of the retrieved recommendation record 200. For example, the recommendation module 112 can retrieve recommendation records 200 from the recommendation data store 122 that have more than a minimum number of matching values in the fields of the records 200 (e.g., matching application name, categories, subcategories, or keywords). The result is a consideration set of records. Furthermore, the recommendation module 112 can limit the membership of the consideration set based on the recommendation parameters.

At operation 514, the recommendation module 112 scores and ranks the records 200 in the consideration set of records. According to some implementations, the recommendation module 112 can score the retrieved records 200 based on the matches between the matching values in the various fields of the records 200. For example, the score can be based on matches of subcategories 214, categories 214, application name 210, and/or keywords defined in the state data 216. The better quality of the matches, the higher the score of the recommendation record 200. The recommendation module 112 can rank the recommendation records 200 based on their respective scores.

At operation 516, the recommendation module 112 generates recommendation results 168 based on the ranked set of recommendation records 200 and transmits the records to the user device 150. The recommendation module 112 can select the N highest ranked recommendation records 200. The value of N may be a default value or a value defined in the recommendation parameters. The recommendation module 112 can generate recommendation objects 166 for each record 200 selected for inclusion in the recommendation results 168 based on the resource identifier 104 defined in the record 200, and additional data that may be obtained from the record 200 (e.g., application name, a description of the state, and an icon of the native application). In this way, each recommendation object 166 may be rendered into a user selectable recommended link 164. The recommendation module 112 can transmit the collection of recommendation objects 166 to the user device 150 in the recommendation results 168.

Figure 6:
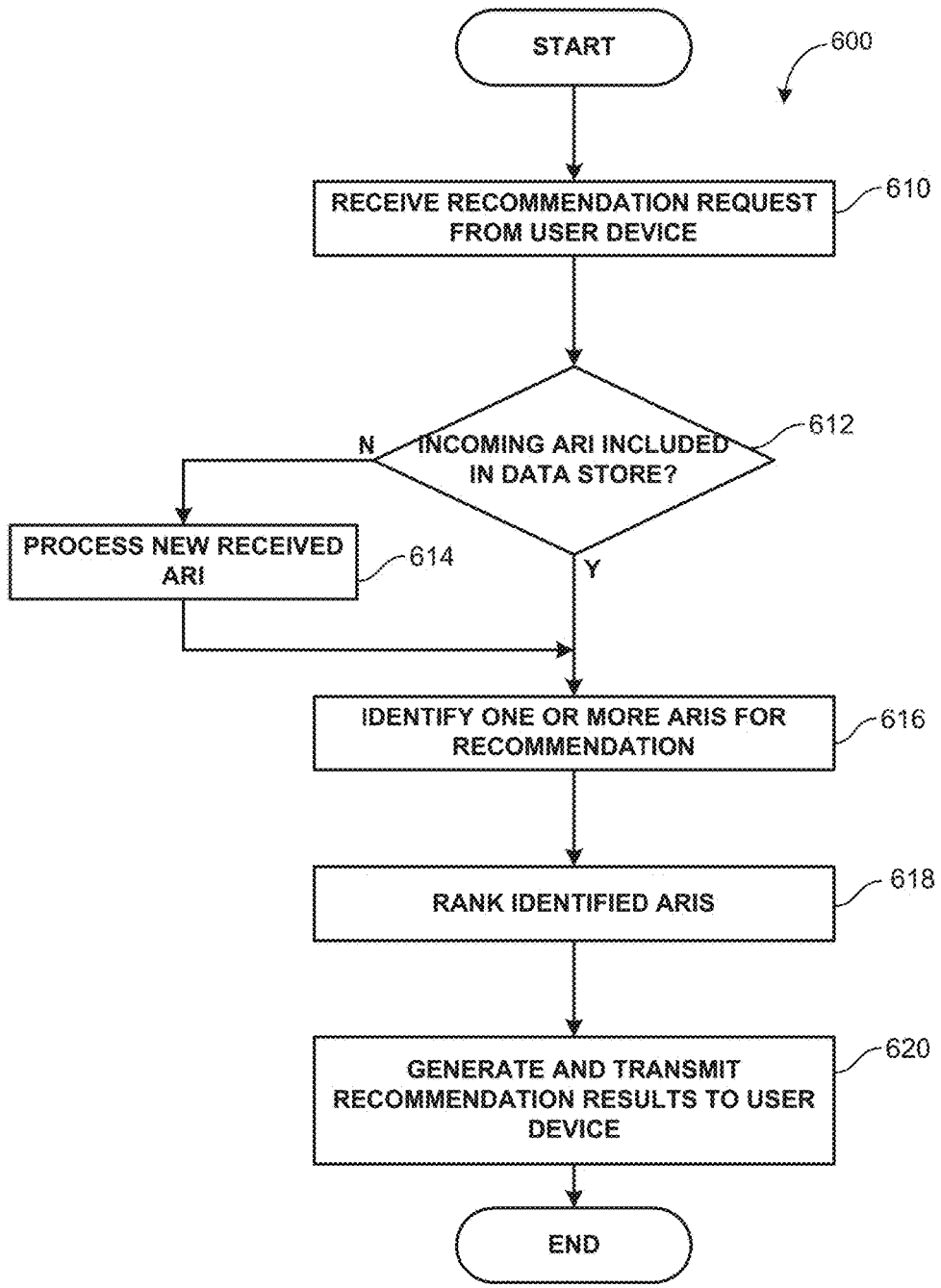

FIG. 6 illustrates an example set of operations for a method 600 for recommending one or more states to one or more native applications 160. In some scenarios, a recommendation request 102 includes an application resource identifier 104 of a state that is not yet indexed in recommendation record 200. For example, a new news article posted in an application may not yet be indexed by the recommended engine 100 when the native application module 162 transmits a recommendation request 102. According to the method of FIG. 6, the recommendation engine 100 can identify recommended states to a user device accessing a not yet indexed accessed state. The method 600 is executed by a processing device of the recommendation engine 100.

At operation 610, the recommendation module 112 receives a recommendation request 102 via the network 195. The recommendation request 102 can include an application resource identifier, user data (e.g., a geolocation), and/or request parameters. The recommendation module 112 decodes the recommendation request to identify the contents thereof.

At operation 612, the recommendation module 112 determines whether there is a recommendation record 200 in the recommendation data store 122. If there is, the recommendation module 112 retrieves the recommendation record 200 and the method continues to operation 616, otherwise the method continues to operation 614.

At operation 614, the record generation module 114 generates a new recommendation record 200 based on the application resource identifier 104 received in the recommendation request 102. The record generation module 114 can analyze (e.g., scrape and/crawl) the native application at the accessed state. During the analysis, the record generation module 114 can identify categories, subcategories, keywords, the contents of the native application at the state, a name of the application, and a title of the accessed state. In some implementations, the record generation module 114 can utilize an app specific ontology to create the recommendation record 200. The record generation module 114 can store the newly generated recommendation record 200 in the recommendation data store 122.

At operation 616, the recommendation module 112 identifies one or more application resource identifiers 104 for recommendation based on the application resource identifier 104 of the accessed state. The recommendation module 112 retrieves a recommendation record 200 corresponding to the received application resource identifier 104 from the recommendation data store 122 using the received application resource identifier 104. In some scenarios, the recommendation module 112 retrieves the newly generated recommendation record 200. The recommendation module 112 can identify recommendation records 200 of other states of applications based on the contents of the retrieved recommendation record 200. For example, the recommendation module 112 can retrieve recommendation records 200 from the recommendation data store 122 that have more than a minimum number of matching values in the fields of the records 200 (e.g., matching application name, categories, subcategories, or keywords). The recommendation module 112 includes the identified recommendation records in a consideration set of records. Furthermore, the recommendation module 112 can limit the membership of the consideration set based on the recommendation parameters.

At operation 618, the recommendation module 112 scores and ranks the records 200 in the consideration set of records. According to some implementations, the recommendation module 112 can score the retrieved records 200 based on the matches between the matching values in the various fields of the records. For example, the score can be based on matches of subcategories, categories, application name, and/or keywords. The better quality of the matches, the higher the score of the recommendation record 200. The recommendation module 112 can rank the recommendation records 200 based on their respective scores.

At operation 620, the recommendation module 112 generates recommendation results 168 based on the ranked set of recommendation records 200 and transmits the records to the user device 150. The recommendation module 112 can select the N highest ranked recommendation records 200. The value of N may be a default value or a value defined in the recommendation parameters. The recommendation module 112 can generate recommendation objects 166 for each record 200 selected for inclusion in the recommendation results 168 based on the resource identifier 104 defined in the record, and additional data that may be obtained from the record (e.g., application name, a description of the state, and an icon of the native application). In this way, each recommendation object 166 may be rendered into a user selectable recommended link 164. The recommendation module 112 can transmit the collection of recommendation objects 166 to the user device 150 in the recommendation results 168.

Figure 7:
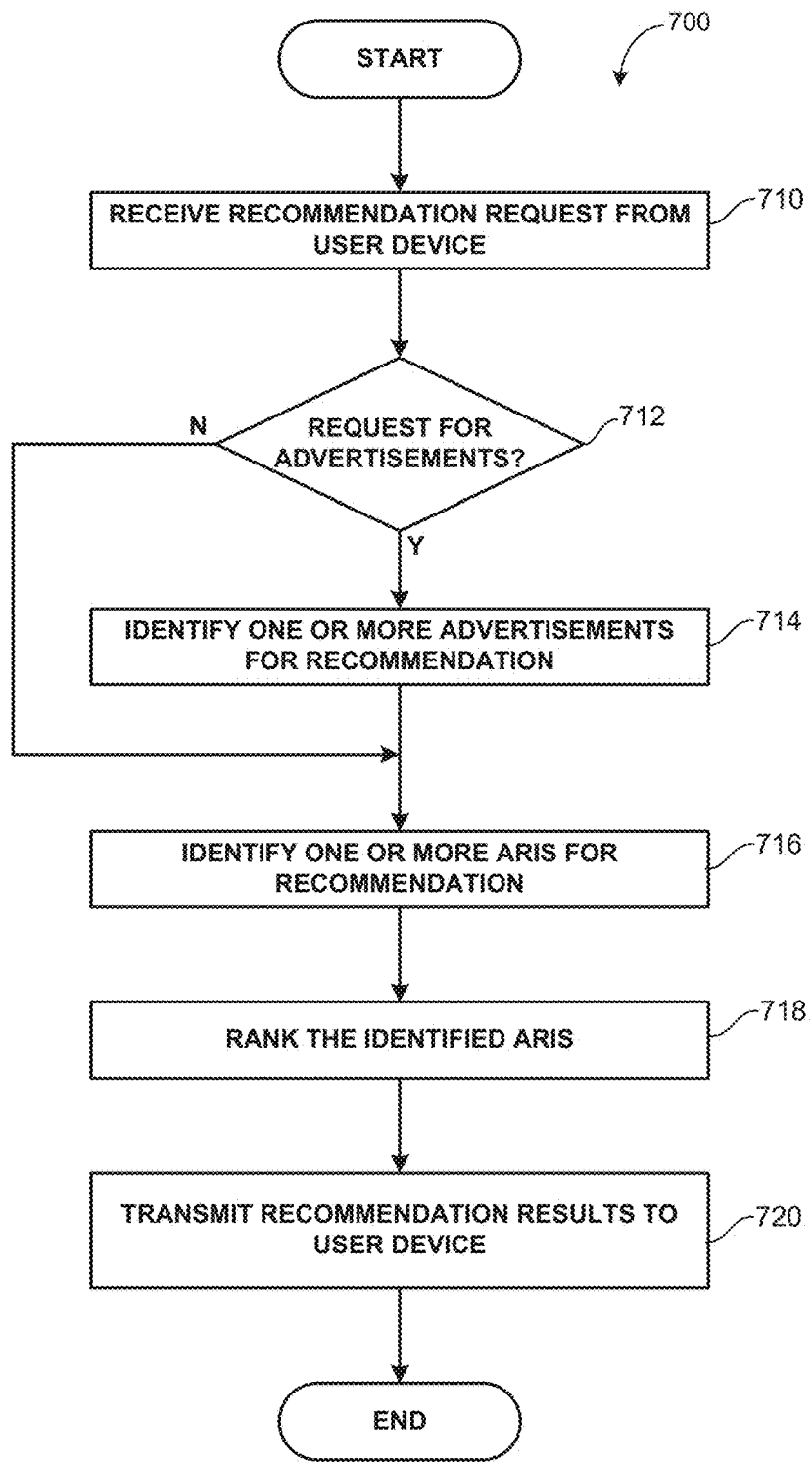

FIG. 7 illustrates an example set of operations for a method for recommending sponsored states of native applications. A sponsored state is a state where a third party has agreed to provide some form of payment in exchange for traffic being directed to a native application. The method 700 is executed by a processing device of the recommendation engine 100.

At operation 710, the recommendation module 112 receives a recommendation request 102 via the network 195. The recommendation request 102 can include an application resource identifier 104 of an accessed state, user data (e.g., a geolocation), and/or request parameters. In some scenarios, the request parameters indicate that sponsored states are required and/or allowed in the recommendation results 168. The recommendation module 112 identifies the contents of the recommendation request.

At operation 712, the recommendation module 112 determines whether the recommendation request 102 includes a request for sponsored states and/or permits sponsored states. If so, the recommendation module 112 identifies one or more recommendation records 200 in the recommendation data store a) based on the received application resource identifier and b) that correspond to sponsored states, as shown at operation 714. As previously discussed, the recommendation module 112 can identify recommendation records 200 from the recommendation data store 122 based on the content of the respective recommendation records and the recommendation record 200 corresponding to the received application resource identifier (e.g., based on matches in fields of the sponsored recommendation records 200 and the recommendation record corresponding to the received application resource identifier). The recommendation module 112 can include the identified recommendation records 200 in the consideration set of records.

At operation 716, the recommendation module 112 identifies one or more application resource identifiers for recommendation based on the application resource identifier of the accessed state. The recommendation module 112 retrieves a recommendation record 200 corresponding to the received application resource identifier 104 from the recommendation data store 122 using the received application resource identifier 104. The recommendation module 112 can identify recommendation records of other states of applications based on the contents of the retrieved recommendation record 200. For example, the recommendation module 112 can retrieve recommendation records 200 from the recommendation data store 122 that have more than a minimum number of matching values in the fields of the records 200 (e.g., matching application name, categories, subcategories, or keywords). The result is a consideration set of records. Furthermore, the recommendation module 112 can limit the membership of the consideration set based on the recommendation parameters. For example, if the recommendation parameters require that all the recommended links must be sponsored links, the recommendation module 112 can remove any recommendation records from the consideration set that do not define sponsored states.

At operation 718, the recommendation module 112 scores and ranks the records 200 in the consideration set of records. According to some implementations, the recommendation module 112 can score the retrieved records 200 based on the matches between the matching values in the various fields of the records. For example, the score can be based on matches of subcategories, categories, application name, and/or keywords. The better quality of the matches, the higher the score of the recommendation record 200. The recommendation module 112 can rank the recommendation records 200 based on their respective scores.

At operation 720, the recommendation module 112 generates recommendation results 168 based on the ranked set of recommendation records 200 and transmits the records to the user device 150. The recommendation module 112 can select the N highest ranked recommendation records 200. The value of N may be a default value or a value defined in the recommendation parameters. The recommendation module 112 can generate recommendation objects 166 for each record 200 selected for inclusion in the recommendation results 168 based on the resource identifier 104 defined in the record 200, and additional data that may be obtained from the record 200 (e.g., application name, a description of the state, and an icon of the native application). In this way, each recommendation object 166 may be rendered into a user selectable recommended link. The recommendation module 112 can transmit the collection of recommendation objects 166 to the user device 150 in the recommendation results 168.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus," "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or fronted components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
   receiving, at a processing device via a network, a request from a user device executing a first native application indicated in the request, the request indicating an accessed state of the first native application to which the first native application is set;
   identifying, at the processing device, one or more categories of the accessed state of the first native application;
   identifying, at the processing device, a plurality of recommended application resource identifiers based on features of the accessed state, each of the recommended application resource identifiers referencing a different state of a native application of a plurality of native applications and, when selected by the user within the accessed state, changing the accessed state of the first native application to the different state of native application of the plurality of native applications, the plurality of native applications including the first native application indicated by an application state indicator; and
   for each of the recommended application resource identifiers:
      identifying, by the processing device, one or more recommended categories of the state referenced by the recommended application resource identifier,
      determining, by the processing device, whether to recommend the different state referenced by the recommended application resource identifier based on features of the accessed state and features of the state of the application, including at least one of the one or more categories of the accessed state and one or more recommended categories of the state referenced by the recommended application resource identifier, and
      when the different state is to be recommended, providing, by the processing device and via the network, the recommended application resource identifier to the user device in recommendation results,
   wherein the recommended application resource identifier includes information indicating a difference between the different state referenced by the recommended application resource identifier and the accessed state of the first native application.

2. The method of claim 1, wherein the request comprises an application resource identifier that, when selected by the user, sets the first native application to the accessed state.

3. The method of claim 1, wherein the determining of whether to recommend the different state referenced by the recommended application resource identifier comprises:
   determining a score of the recommended application resource identifier based on the features of the state referenced by the recommended application resource identifier, including the one or more recommended categories, and the features of the accessed state, including the one or more categories, and
   wherein the determination to recommend the different state is based on the score.

4. The method of claim 3,
   wherein the request further comprises a geo-location of the user device, and
   wherein the score of each recommended application resource identifier is further based on the geo-location.

5. The method of claim 3, wherein the determining of the score of each recommended application resource identifier comprises:
   retrieving an accessed state recommendation record from a plurality of recommendation records based on a resource identifier indicating the accessed state, the accessed state recommendation record storing features of the accessed state;
   retrieving a recommendation record storing the recommended application resource identifier from a plurality of recommendation records based on one or more features stored in the recommendation record and one or more features stored in the accessed state recommendation record, each recommendation record of the plurality of recommendation records respectively defining features of a different state of one of a plurality of native applications; and
   determining the score of the recommendation record based on the features stored in the recommendation record and the features stored in the accessed state recommendation record.

6. The method of claim 5, wherein the retrieving of the accessed state recommendation record comprises:
   determining whether the accessed state recommendation record is stored among the plurality of recommendation records; and
   when the accessed state record is not stored among the plurality of recommendation records:

obtaining data associated with the accessed state of the first native application from the first native application, generating the accessed state recommendation record, storing the accessed state recommendation record among the plurality of recommendation records, and retrieving the accessed state recommendation record.

7. The method of claim 5, wherein each of the recommendation records comprises a plurality of fields that respectively define the one or more features of the defined state, each field having a weight attributed thereto, the weight being attributed to the feature defined in the field, and wherein the score of a recommended application resource identifier is further based on the weights attributed to the one or more features defined in the recommendation record of the recommended application resource identifier.

8. The method of claim 1, wherein the request comprises one or more request parameters, the request parameters defining a number of application resource identifiers to include in the recommendation results or types of application resource identifiers to include in the recommendation results.

9. The method of claim 1, where at least one of the application resource identifiers is used to access a sponsored state of an application.

10. The method of claim 1, where at least one of the application resource identifiers is used to access a state of a different native application.

11. A recommendation engine comprising:

a network interface device configured to communicate with external devices over a network;

a storage device configured to store a recommendation data store, the recommendation data store configured to:

store a plurality of recommendation records, each of the plurality of recommendation records respectively corresponding to a different state of one of a plurality of native applications, and store an application resource identifier to access the different state of one of the plurality of native applications; and a processing device configured to execute computer readable instructions, the computer readable instructions, when executed by the processing device, cause the processing device to:

receive, via a network, a request from a user device executing a first native application indicated in the request, the request indicating an accessed state of the first native application to which the first native application is set, identify, at the processing device, one or more categories of the accessed state of the first native application, identify a plurality of recommended application resource identifiers based on features of the accessed state defined in an accessed state recommendation record corresponding to the accessed state and stored in the recommendation data store, wherein each of the recommended application resource identifiers references a different state of one of the plurality of native applications and, when selected by the user within the accessed state, change the accessed state of the first native application to the different state of one of the plurality of native applications, the plurality of native applications including the first native application indicated by an application state indicator, and for each of the recommended application resource identifiers:

identify one or more recommended categories of the state referenced by the recommended application resource identifier, determine whether to recommend the different state referenced by the recommended application resource identifier based on features of the accessed state and features of the state of the application, including at least one of the one or more categories of the accessed state and one or more recommended categories of the state referenced by the recommended application resource identifier, and when the different state is to be recommended, provide the recommended application resource identifier in recommendation results to the user device via the network, wherein the recommended application resource identifier includes information indicating a difference between the different state referenced by the recommended application resource identifier and the accessed state of the first native application.

12. The recommendation engine of claim 11, wherein the request comprises an application resource identifier that, when selected by the user, sets the first native application to the accessed state.

13. The recommendation engine of claim 11, wherein the determining of whether to recommend the different state referenced by the recommended application resource identifier comprises:

determining a score of the recommended application resource identifier based on features of the state referenced by the recommended application resource identifier, including the one or more recommended categories, and the features of the accessed state, including the one or more categories, and wherein the determination to recommend the different state is based on the score.

14. The recommendation engine of claim 13, wherein the request further comprises a geo-location of the user device, and wherein the score of each recommended application resource identifier is further based on the geo-location.

15. The recommendation engine of claim 13, wherein the determining of the score of each recommended application resource identifier comprises:

retrieving the accessed state recommendation record from the recommendation data store based on an accessed state resource identifier indicating the accessed state, the accessed state recommendation record storing features of the accessed state, retrieving a recommendation record storing the recommended application resource identifier from the recommendation data store based on one or more features stored in the recommendation record and one or more features stored in the accessed state recommendation record, and determining the score of the recommendation record based on the features stored in the recommendation record and the features stored in the accessed state recommendation record.

16. The recommendation engine of claim 15, wherein the retrieving of the accessed state recommendation record comprises:
determining whether the accessed state recommendation record is stored among the plurality of recommendation records, and
when the accessed state record is not stored among the plurality of recommendation records:
obtaining data associated with the accessed state of the first native application from the first native application,
generating the accessed state recommendation record,
storing the accessed state recommendation record among the plurality of recommendation records, and
retrieving the accessed state recommendation record.

17. The recommendation engine of claim 15,
wherein each of the recommendation records comprises a plurality of fields that respectively define the one or more features of the defined state, each field having a weight attributed thereto, the weight being attributed to the feature defined in the field, and
wherein the score of a recommended application resource identifier is further based on the weights attributed to the one or more features defined in the recommendation record of the recommended application resource identifier.

18. The recommendation engine of claim 11, wherein the request comprises one or more request parameters, the request parameters defining a number of application resource identifiers to include in the recommendation results or types of application resource identifiers to include in the recommendation results.

19. The recommendation engine of claim 11, where at least one of the application resource identifiers is used to access a sponsored state of an application.

20. The recommendation engine of claim 11, where at least one of the application resource identifiers is used to access a state of a different native application.

* * * * *